United States Patent [19]
Yonehara

[11] Patent Number: 5,265,089
[45] Date of Patent: Nov. 23, 1993

[54] LOOPBACK TEST CIRCUIT

[75] Inventor: Akifumi Yonehara, Tokyo, Japan

[73] Assignee: NEC Corporation, Tokyo, Japan

[21] Appl. No.: 6,716

[22] Filed: Jan. 21, 1993

Related U.S. Application Data

[63] Continuation of Ser. No. 657,757, Jan. 30, 1991, abandoned.

[30] Foreign Application Priority Data

Jan. 30, 1990 [JP] Japan ................................. 2-20564

[51] Int. Cl.$^5$ .............................................. H04J 3/14
[52] U.S. Cl. ...................................... 370/15; 370/13; 379/5; 371/20.4; 371/20.5
[58] Field of Search ................... 370/13, 15; 379/1, 5; 371/20.4, 20.5

[56] References Cited

U.S. PATENT DOCUMENTS

| | | | |
|---|---|---|---|
| 4,271,513 | 6/1981 | Maejima et al. ................... | 370/15 X |
| 4,686,668 | 8/1987 | Koseki et al. ........................ | 370/15 |
| 4,695,997 | 9/1987 | Montanari et al. .................. | 370/13 |
| 4,860,281 | 8/1989 | Finley et al. ......................... | 370/15 |

Primary Examiner—Douglas W. Olms
Assistant Examiner—Russell Blum
Attorney, Agent, or Firm—Whitham & Marhoefer

[57] ABSTRACT

A digital multiplex communication system for carrying out digital multiplex communication between a plurality of terminal stations, at least two including one initiating party and the other party to communicate with, via a branching unit. In this system, groups of bits in a communication frame are allocated in advance for use in communication between one party and the other. In order to diagnose the state of the transmission line to the other party including the branching unit, loopback setting signals for setting the other party in the loopback test mode and loopback test signals are inserted into specific bit positions of the preallocated groups of bits in performing communication.

11 Claims, 4 Drawing Sheets

LOOPBACK TEST CIRCUIT

CROSS-REFERENCE TO RELATED APPLICATION

This application is a continuation of application Ser. No. 07/657,757 filed Jan. 30, 1991, now abandoned.

BACKGROUND OF THE INVENTION

The present invention relates to a digital multiplex communication system having a loopback test circuit for diagnosing whether the transmission line between digital multiplexers is in a normal state or not.

DESCRIPTION OF THE PRIOR ART

Commonly, loopback tests are carried out to diagnose the state of the four-wire transmission line linking digital multiplexers at two terminal stations. In such a loopback test, the state of the transmission line is diagnosed by sending test signals from a first terminal station to a second, returning them from the second to the first and checking whether the returned signals are identical with the original signals. In more detail, in advance of the loopback test, a loopback connection is set at the second terminal station to return the signals, received over the receiving path of the transmission line, as they are over the sending path of the transmission line. After that, loopback signals for the testing purpose, having a predetermined pattern (for instance a PN pattern), are sent from the first terminal station. The loopback signals sent from the first terminal station, after being received by the second terminal station, are returned and received again by the first terminal station. The pattern of these received signals is checked with the original pattern to judge whether or not a bit error has arisen.

The loopback connection may be set either manually or automatically. Manual setting is achieved through liaison by telephone between the terminal stations. For the automatic procedure, loopback setting signals are sent via the transmission line to instruct the setting of a loopback connection, and automatic setting is achieved at the second station having received the signals.

In a loopback test circuit of the automatic setting system according to the prior art, a loopback signal generating circuit and a loopback signal detecting circuit are provided at the first terminal station, while a loopback setting signal detecting circuit and a loopback setting switch are arranged at the second. A test begins with the sending of loopback setting signals and loopback signals from the loopback signal generating circuit at the first terminal station. At the second terminal station, upon detection of the loopback setting signals by the loopback setting signal detecting circuit, the loopback setting switch is controlled so as to set a loopback connection. After that, the second terminal sends back the loopback signals sent from the first station via the loopback connection to the first station. At the first station having received the returned loopback signal, whether or not the transmission line is in a normal state is determined by having the loopback signal detecting circuit detect the absence or presence of any bit error.

The above described loopback test circuit according to the prior art requires that all the loopback signals sent from the first terminal station reach and be returned from the second. If, however, there is a branching unit, to which is connected a branch line to a third terminal station, midway on the transmission line between the first and second stations, this requirement cannot be satisfied and accordingly the prior art loopback test circuit cannot be used. Thus, part of the sequence of loopback setting signals and loopback signals sent from the first terminal station would be branched by the branching unit to the third station and would not reach the second station. Instead, communication signals from the third to the second station would be inserted. If the latter part of the sequence of loopback setting signals is branched, the second station wil be unable to receive the loopback setting signals and therefore unable to set a loopback connection. Even if the branching does not take place midway in the sequence of loopback setting signals and instead the latter part of the sequence of loopback signals is branched, a loop connection will be set at the second station, but the returned signals will have some of the loopback signals replaced with signals from the third station as mentioned above and further replaced, on their way back, with communication signals from the third to the first station, with the result that pattern checking between the signals returned to the first station and the original loopback signals becomes meaningless.

BRIEF SUMMARY OF THE INVENTION

Object of the Invention

An object of the present invention, therefore, is to provide a loopback test circuit capable of loopback-testing the transmission lines in a digital multiplex communication system having a branching unit midway on each transmission line.

Summary of the Invention

A digital communication system according to the invention performs digital multiplex communication between at least first, second and third terminal stations. In this system, groups of bits in a communication frame are allocated in advance for communication between one communicating station and the others. In order to diagnose the transmission line with the other communication party including a branching unit, loopback setting signals for setting the other party in the loopback testing mode and loopback test signals are inserted into specific bit positions in this preallocated group of bits in performing communication.

BRIEF DESCRIPTION OF THE DRAWINGS

The above-mentioned and other objects, features and advantages of this invention will become more apparent by referring to the following detailed description of the invention taken in conjunction with the accompanying drawings, wherein.

DETAILED DESCRIPTION OF THE PREFERRED EMBODIMENTS

Figure 1:
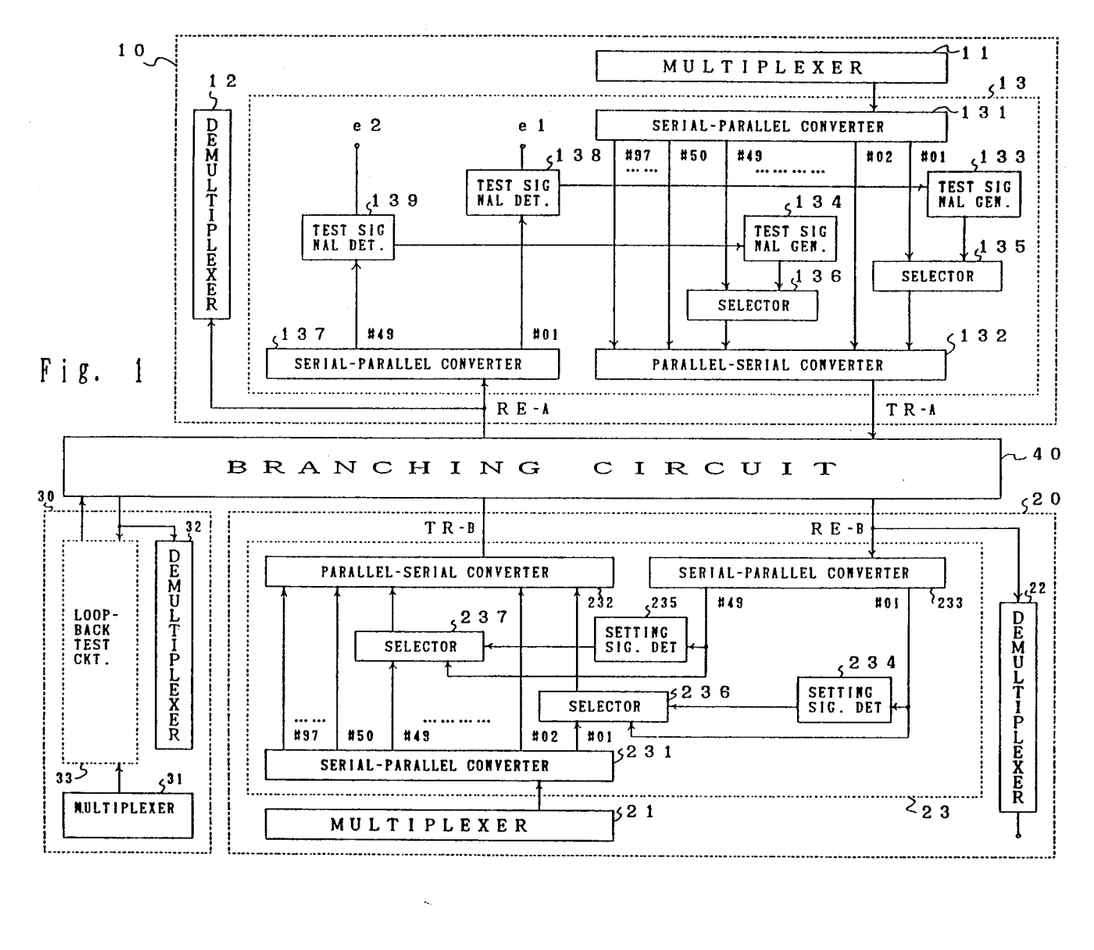
FIG. 1 is a block diagram of a first preferred embodiment of the invention.

Referring to FIG. 1, a first preferred embodiment of the present invention has first, second and third terminal stations 10, 20 and 30 performing digital multiplex communication between one another and a branching circuit 40 for distributing transmit and receive signals to facilitate efficient digital multiplex communication between these terminal stations.

Transmit signals TR from each terminal station are digital multiplex signals resulting from the time-division multiplexing of signals addressed to the two other stations. Each transmit signal TR is distributed to the two other stations at the branching unit 40. Therefore, signals from the branching unit 40 to each terminal station (receive signals RE of each terminal station) are digital multiplex signals resulting from the time-division multiplexing of signals from the two other stations.

The signal distribution at the branching unit 40 will be described in detail below with reference to FIGS. 2(A) and (B), in which the first, second and third terminal stations 10, 20 and 30 are referred to as terminal stations A, B and C, respectively. Each frame of the transmit signals TR from each terminal station and of the receive signals RE to each station, as illustrated in the frame diagram of FIG. 2(B), consists of 48-bit former half serial signals from #01 through #48 in bit number, 48-bit latter half serial signals from #49 through #96 in bit number, and a frame bit F.

The transmit signal TR-A from the terminal stations A has signals $I_{AB}$, $II_{AB}$, $III_{AB}$, . . . addressed to the terminal station B as former half serial signals, and signals $I_{AC}$, $II_{AC}$, . . . addressed to the terminal station C as latter half serial signals. The former half serial signals $I_{AB}$, $II_{AB}$, $III_{AB}$, . . . addressed to the terminal station B become the former half serial signals of the receive signal RE-B of the terminal station B at the branching unit 40. The signals $I_{AC}$, $II_{AC}$, . . . addressed to the terminal station C are delayed by an approximately half frame at the branching unit 40, and become the former half serial signals of the receive signal RE-C of the terminal station C.

The transmit signal TR-B from the terminal stations B has signals $I_{BA}$, $II_{BA}$, $III_{BA}$, . . . addressed to the terminal station A as former half serial signals, and signals $I_{BC}$, $II_{BC}$, . . . addressed to the terminal station C as latter half serial signals. The former half serial signals $I_{BA}$, $II_{BA}$, $III_{BA}$, . . . addressed to the terminal station A become the former half serial signals of the receive signal RE-A of the terminal station A at the branching unit 40. The signals $I_{BC}$, $II_{BC}$, . . . addressed to the terminal station C become the latter half serial signals of the receive signal RE-C of the terminal station C at the branching unit 40.

The transmit signal TR-C from the terminal station C has signals $I_{CA}$, $II_{CA}$, $III_{CA}$, . . . addressed to the terminal station A as former half serial signals, and signals $I_{CB}$, $II_{CB}$, . . . addressed to the terminal station B as latter half serial signals. The former half serial signals $I_{CA}$, $II_{CA}$, $III_{CA}$, . . . addressed to the terminal station A are delayed by an approximately half frame at the branching circuit 40, and become the latter half serial signals of the receive signal RE-A of the terminal station A. The signals $I_{CB}$, $II_{CB}$, . . . addressed to the terminal station B become the latter half serial signals of the receive signal RE-B of the terminal station B at the branching unit 40.

Thus the branching unit 40 efficiently distributes the transmit signals TR from each terminal station, and supplies the receive signals RE to each station, resulting in efficient digital multiplex communication between the three terminal stations.

Referring again to FIG. 1, in the first preferred embodiment, the first terminal station 10 has a digital multiplexer 11 for generating transmit signals TR-A and a digital demultiplexer 12 for receiving receive signals RE-A of the first terminal station 10. The digital multiplexer 11 generates the serial transmit signals TR-A each consisting of the former half serial signals addressed to the second terminal station 20, the latter half serial signals addressed to the third terminal station 30 and the frame bit F. The second terminal station 20 has a digital multiplexer 21 for generating transmit signals TR-B and a digital demultiplexer 22 for receiving receive signals RE-B of the second terminal station 20. The digital multiplexer 21 generates the serial transmit signals TR-B each consisting of the former half serial signals addressed to the first terminal station 10, the latter half serial signals addressed to the third terminal station 30 and the frame bit F. The third terminal station 30 has a digital multiplexer 31 for generating transmit signals TR-C and a digital demultiplexer 32 for receiving receive signals RE-C of the third terminal station 30. The digital multiplexer 31 generates the serial transmit signals TR-C each consisting of the former half serial signals addressed to the first terminal station 10, the latter half serial signals addressed to the second terminal station 20 and the frame bit F.

Further in the first preferred embodiment, the first, second and third terminal stations 10, 20 and 30 have loopback test circuits 13, 23 and 33, respectively, for performing loopback tests to judge whether the transmission line including the branching unit 40 is in a normal state or not. In the first embodiment, a loopback test mode is set by transmitting loopback test signals from the loopback test circuit 13 provided in the first terminal station 10 to the loopback test circuits 23 and 33 arranged in the second and third terminal stations 20 and 30, respectively. Once the loopback test mode is set, the loopback test circuit 13 transmits the loopback test signals as the transmit signals TR-A. The loopback test circuits 23 and 33, upon receiving the loopback test signals, send back the received loopback test signals as the transmit signals TR-B and TR-C, respectively, to the first terminal station 10.

Loopback setting signals are two-byte (16-bit) serial signals consisting of a bit pattern of "1001010000010100". The loopback test signals are PN codes consisting of 511 ($2^9-1$) bits per cycle of M sequences generated by a nine-stage shift register. In the first preferred embodiment, the loopback setting signals and the loopback test signals are transmitted at a rate of one bit per frame.

The loopback test circuit 13 provided in the first terminal 10 has a serial-to-parallel converting circuit 131 for converting the serial transmit signals TR-A from the digital multiplexer 11 into 97-bit parallel signals; a parallel-to-serial converting circuit 132 for reconverting the 97-bit parallel signals into the original serial transmit signals TR-A; test signal generating circuits 133 and 134 for generating the loopback setting signals and loopback test signals; and selectors 135 and 136 for inserting individual bits of the loopback setting signals and loopback test signals into the bit positions of

01 through #49 in bit number at a rate of one bit per frame.

Figure 3:
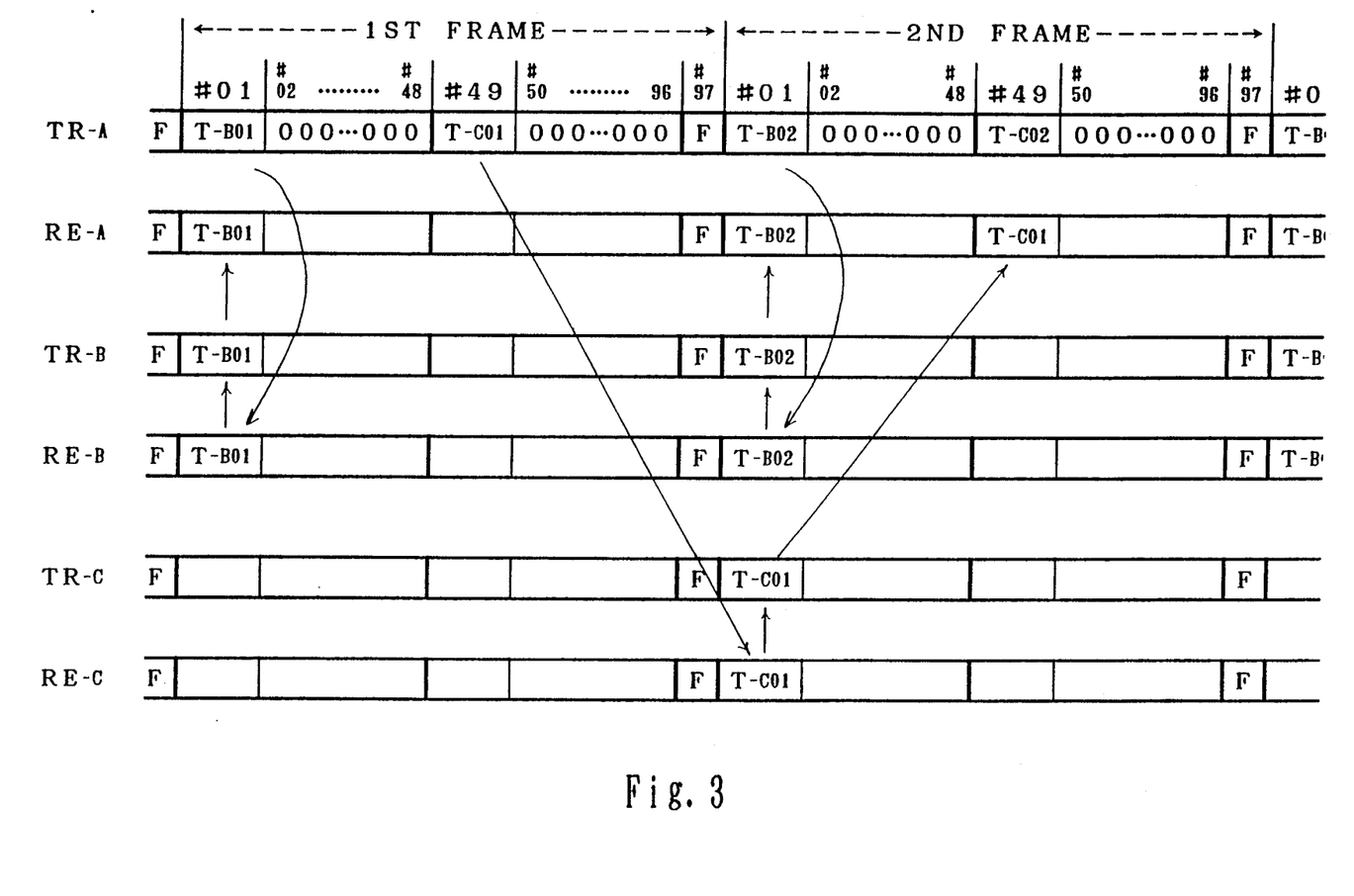
FIG. 3 is a timing chart of the test signals in the first embodiment.

At normal times, the selectors 135 and 136 select signals from the parallel-to-serial converting circuit 131. The serial transmit signals TR-A, though once converted into parallel signals, are reconverted by the parallel-to-serial converting circuit 132 into the original serial transmit signals TR-A to be transmitted. In diagnosing the transmission line, the transmit signals from the digital multiplexer 11 are suspended, and the selector 135 and 136 are so switched over as to select the signals from the test signal generating circuits 133 and 134. This results in the transmission to the branching unit 40 of signals as serial transmit signals TR-A, each comprising, as shown in FIG. 3, test signal bits T-B (T-B01, T-B02, . . . ) inserted into the bit position of #01 in bit number and addressed to the second terminal station 20, test signal bits T-C (T-C01, T-C02, . . . ) inserted into the bit position of #49 in bit number and addressed to the third terminal station 30, and the frame bit F of #97 in bit number. As the test signals are thus transmitted at a rate of one bit per frame, the transmission of a loopback setting signal having a two-byte (16-bit) composition requires 16 frames. Or the transmission of a 511-bit loopback test signal requires 511 frames. The timing of the switching from the transmission of loopback setting signals to that of loopback test signals will be explained afterwards.

Figure 2A:
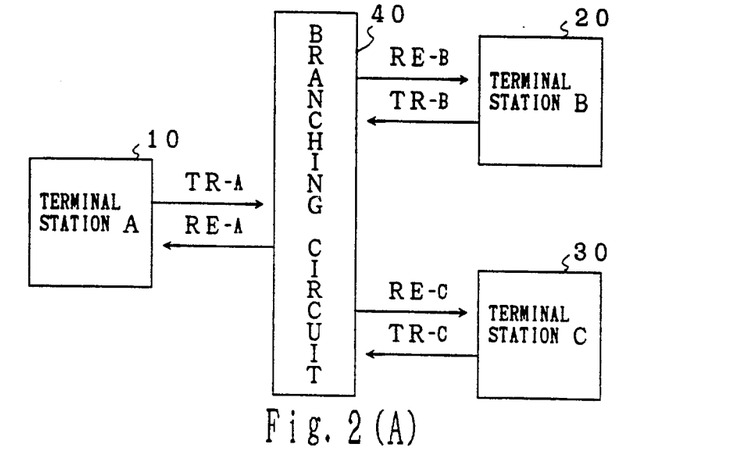
FIG. 2(A) is a summarized block diagram of the first preferred embodiment for explaining the branching action of the branching unit 40 in the first embodiment illustrated in FIG. 1.
Figure 2B:
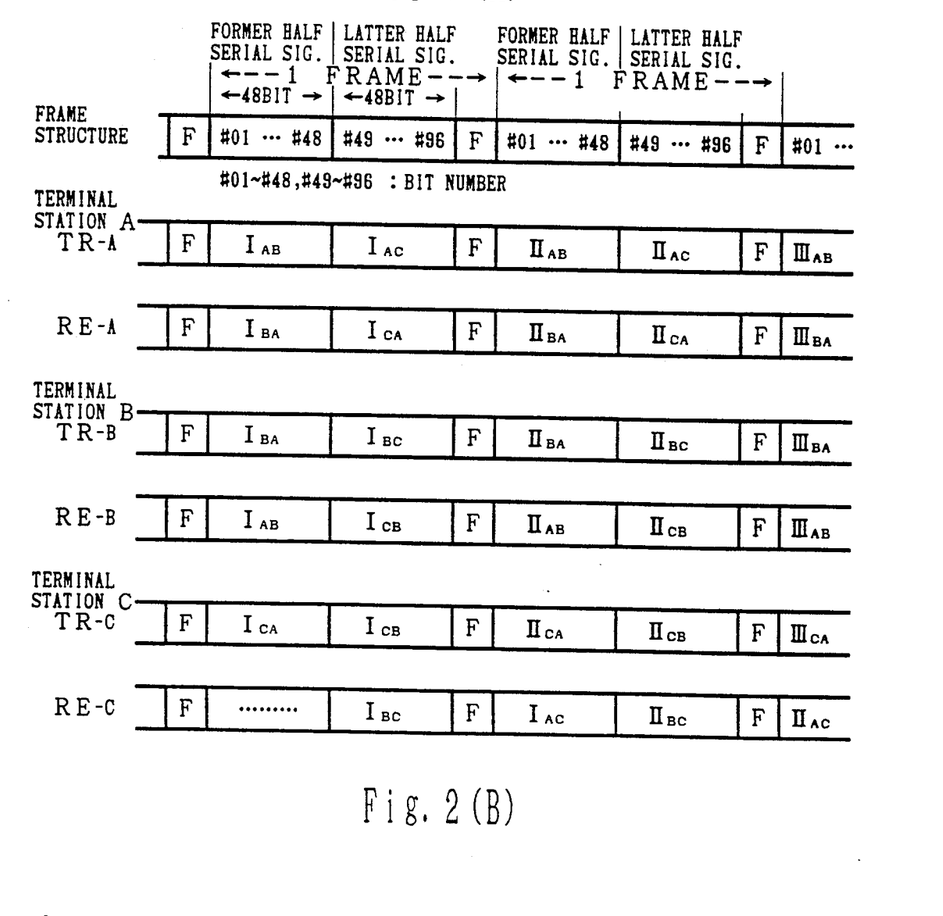
FIG. 2(B) is a timing chart for explaining the branching action of the branching unit 40.

The branching unit 40 distributes the transmit signals TR-A from the first terminal station 10 to the second and third terminal stations 20 and 30 in the manner illustrated in FIG. 2. Therefore, as indicated by arrows in FIG. 3, the test signal T-B01 inserted into the position of #01 in bit number in the first frame is further inserted into the position of #01 in bit number in the first frame of the receive signal RE-B of the second terminal station 20 and received by the second terminal station 20. The test signal T-C01 inserted into the position of #49 in bit number in the first frame is further inserted into the position of #01 in bit number in the second frame of the receive signal RE-C of the third terminal station 30 and received by the third terminal station 30.

The loopback test circuits 23 and 33 provided in the second terminal station 20 and the third terminal station 30, respectively, are the same as each other in configuration. The loopback test circuit 23 in the second terminal station has, as shown in FIG. 1, a serial-to-parallel converting circuit 231 for converting the serial transmit signals TR-B from the digital multiplexer 21 into 97-bit parallel signals; a parallel-to-serial converting circuit 232 for reconverting the 97-bit parallel signals into the original serial transmit signals TR-B; a serial-to-parallel converting circuit 233 for converting the serial receive signals RE-B into 97-bit parallel signals; loopback setting signal detecting circuits 234 and 235 for receiving the bits respectively of #01 and #49 in bit number from the serial-to-parallel converting circuit 233, and detecting the loopback setting signals; and selectors 236 and 237 for inserting, upon detection of a loopback setting signal, receive bits of #01 and #49 in bit number of the serial-to-parallel converting circuits 233 into positions of the bits of respectively #01 and #49 in bit number of the parallel-to-serial converting circuit 231.

The receive signal RE-B received by the second terminal station 20 is converted into a 97-bit parallel signal by the serial-to-parallel converting circuit 233. The receive bits of #01 and #49 in bit number in that parallel signal are supplied to the loopback setting signal detecting circuits 234 and 235, respectively. The loopback setting signal detecting circuits 234 and 235 check if the bit pattern received over a plurality of frames is identical with the bit pattern of the loopback setting signal. If the loopback setting signal is detected, the corresponding selector 236 or 237 is switched over, and the received bit signal #01 or #49 is inserted into the transmit signal TR-B from the second terminal station 20 and sent to the branching unit 40. Since a test signal bit T-B from the first terminal station 10 is now supposed to be inserted into the position of #01 in bit number in the received signal RE-B of the second terminal station 20, the loopback setting signal detecting circuit 234 detects the loopback setting signal at the time the first 16 frames have passed. Upon detection of the loopback setting signal by the loopback setting signal detecting circuit 234, the selector 236 inserts the signal of #01 in bit number in the receive signal RE-B (the test signal bit T-B from the first terminal station 10) into the position of #01 in bit number in the transmit signal TR-B, and returns it to the first terminal station 10. Thus the test signal T-B from the first terminal station 10 addressed to the second terminal station 20, as indicated by arrows in FIG. 3, is received as inserted into the position of #01 in bit number in the receive signal RE-B of the second terminal station 20, sent out by the selector 236, as inserted into the position of #01 in bit number in the transmit signal TR-B of the second terminal station 20, and received by the first terminal station 10, as inserted into the position of #01 in bit number in the receive signal RE-A of the first terminal station 10.

The loopback test circuit 33 provided in the third terminal station 30 has the same configuration as the loopback test circuit provided in the second terminal station 20. Therefore, the test signal T-C from the first terminal station 10 addressed to the third terminal station 30, as indicated by arrows in FIG. 3, is received as inserted into the position of #01 in bit number in the next frame of the receive signal RE-C of the third terminal station 30, sent out by a selector, as inserted into the position of #01 in bit number in the transmit signal TR-C of the third terminal station 30, and received by the first terminal station 10, as inserted into the position of #49 in bit number in the receive signal RE-A of the first terminal station 10.

As shown in FIG. 1, the loopback test circuit 13 provided in the first terminal 10 further has a serial-to-parallel converting circuit 137 for converting the serial receive signals RE-A into 97-bit parallel signals, and test signal detecting circuits 138 and 139 for respectively receiving receive bits of #01 and #49 in bit number from the serial-to-parallel converting circuit 137 and detecting the loopback setting signals and the loopback test signals.

Therefore, after 16 frames have passed since the start of the transmission of the loopback setting signals, the test signal bits T-B and T-C sent from the first terminal station 10 to the second terminal station 20 and the third terminal station 30, respectively, are returned from the second and third terminal stations 20 and 30 to the first terminal station 10 to be detected by the test signal detecting circuits 138 and 139, respectively. Since, in the first preferred embodiment of the invention, the loopback setting signals continue to be transmitted until the 16-bit loopback setting signals are detected by the test signal detecting signals 138 and 139, the loopback setting signals are sent over a minimum period of 32 frames, i.e. for at least two consecutive rounds. Thus, upon detection of the first loopback signal, the loopback test circuits 23 and 33 are set in the loopback test mode. The second loopback setting signals received by the loopback test circuits 23 and 33 after they are set in the loopback test mode are returned to the first terminal station 10 to be detected by the test signal detecting circuits 138 and 139, respectively. If no loopback setting signal is received by the first terminal station 10 within a predetermined period, the system will take it as the occurrence of an alarm and stop operating.

Upon detection of the returned loopback setting signals, the test signal detecting circuits 138 and 139 supply the test signal generating circuits 133 and 134, respectively, with control signals to stop the generation of loopback setting signals and to generate loopback test signals. This causes the test signal generating circuits 133 and 134 to generate loopback test signals having 511 bits per cycle. The loopback signal bits addressed to the second terminal station 20 and the third terminal station 30 are transmitted as inserted at a rate of one bit per frame into the positions of #01 and #49, respectively, in bit number in the transmit signal TR-A. As the loopback test circuit 23 of the second terminal station 20 and the loopback test circuit 33 of the third terminal station 30 are set in the loopback test mode, the loopback test signals sent from the loopback test circuit 13 of the first terminal station 10 are returned to the first terminal station 10. The loopback test signals returned from the second and third terminal stations 20 and 30 are respectively detected by the test signal detecting circuits 138 and 139 to give detection results through detection terminals e1 and e2. Since loopback signal transmission from the first terminal station 10 takes place not just once but over a predetermined period, the test signal detecting circuits 138 and 139 perform signal detection more than once each. When the returned test signal has been normally detected a prescribed number of times, the transmission line is judged to be normal.

As the first preferred embodiment of the invention has such a configuration that the loopback test mode is set from the first terminal station, i.e. the loopback setting signals and the loopback test signals are sent from the first terminal station 10 to the other terminal stations, no test signal bits are inserted into the positions of #49 in bit number in the receive signals RE-B and RE-C of the second and third terminal stations 20 and 30, respectively. Therefore, when diagnosing the transmission line with such a configuration, the loopback signal detecting circuit 235 and the selector 237 corresponding to #49 bits in the receive signals can be dispensed with. However, if a test circuit of the same configuration as the loopback test circuit 13 in the first terminal station 10 is provided in the third terminal station 30 to have the loopback test mode set from the third terminal station, test signal bits will be inserted into the positions of #49 in bit number in the receive signals RE-B of the second terminal station 20.

Figure 4:
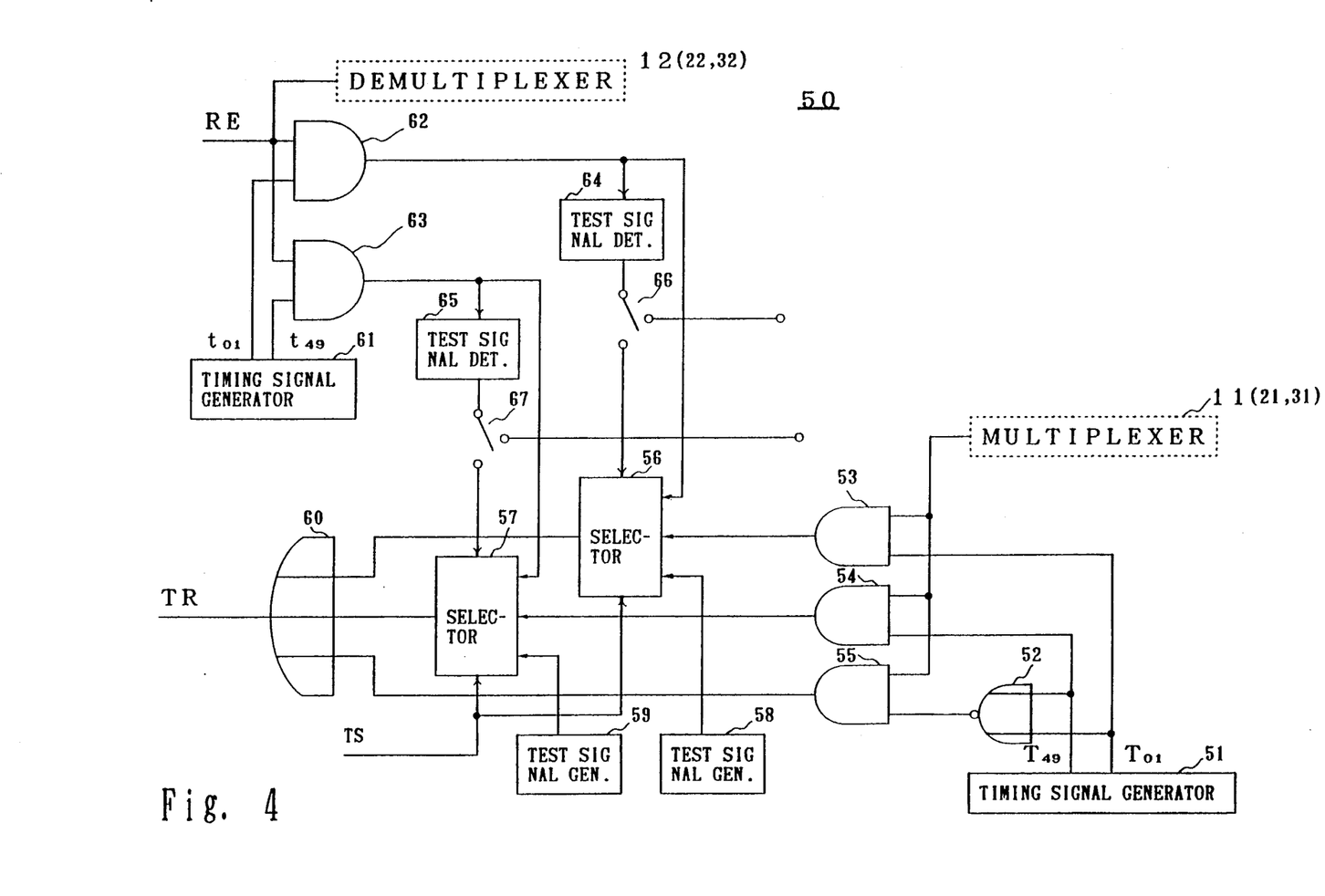
FIG. 4 is a block diagram of a loopback test circuit for use in a second preferred embodiment of the invention.

Next, FIG. 4 illustrates a loopback test circuit 50 to be provided in first, second and third terminal stations 10, 20 and 30 in a second preferred embodiment of the present invention. This loopback test circuit 50 can perform a similar operation to that of the loopback test circuit 13 or 23. The loopback test circuit 50 has a timing signal generating circuit 51 for generating timing signals T01 and T49 pertaining to the time positions of #01 and #49 in bit number in the frames of transmit signals TR; a NOR gate 52 for generating a logical value "1" when no timing signal, neither T01 nor T49, is generated; AND gates 53, 54 and 55 for receiving at one terminal of each the transmit signals TR from a digital multiplexer 11 (or 21 or 31) and at the other terminal the timing signal T01 or T49 or the output signal of the NOR gate 52; selectors 56 and 57 supplied with the output signals of the AND gates 53 and 54, respectively; test signal generating circuits 58 and 59 for generating loopback setting signals and loopback test signals, respectively; an OR gate 60 supplied with the output signals of the AND gate 55 and of the selectors 56 and 57; a timing signal generating circuit 61 for generating timing signals t01 and t49 in the time positions of #01 and #49 in bit number in the frames of the receive signals RE; AND gates 62 and 63 for receiving at one terminal of each the receive signals RE and at the other terminal the timing signal t01 or t49; test signal detecting circuits 64 and 65 for detecting the loopback setting signals and the loopback test signals, respectively; and switches 66 and 67, one arranged between the detection output terminal of the test signal detecting circuit 64 and the selector 56 and the other between the detection output terminal of the test signal detecting circuit 65 and the selector 57. The output signals of the AND gate 62 and 63 are also supplied to the selectors 56 and 57, respectively. At normal times, the selectors 56 and 57 are so set as to select the output signals of the AND gates 53 and 54, respectively.

If this loopback setting circuit 50 is installed in a terminal station which causes the loopback test mode to be set (for instance the first terminal station 10), the movable terminals of the switches 66 and 67 are set to the sides of the detection terminals e1 and e2, respectively. When test start signals 54 are supplied to the selectors 56 and 57 in this state, the selectors 56 and 57 select test signals from the test signal generating circuits 58 and 59. As a result, the test signals are sent to the other terminal stations during the periods of the timing signals T01 and T49, i.e. the periods of #01 and #49 in bit number. When the test signals thereby sent are returned, they are taken out by the AND gates 62 and 63, and supplied to the test signal detecting circuits 64 and 65, respectively. When the loopback setting signals are detected by the test signal detecting circuits 64 and 65, the detection results are supplied (not shown) to the test signal generating circuits 58 and 58 to have loopback test signals generated as in the case of the first preferred embodiment. When the loopback signals are returned, it can be judged whether the transmission lines are normal or not by monitoring the detection terminals e1 and e2.

If the loopback setting circuit 50 is installed in a terminal stations in which the loopback test mode is to be set (for instance the second terminal station 20 and the third terminal station 30), the movable terminals of the switches 66 and 67 are set to the sides of the selectors 56 and 57, respectively. When the loopback setting signals, sent as inserted into the positions of #01 and #49 in bit number in the receive signal RE, are detected by the test signal detecting circuits 64 and 66 in this state, the selectors 56 and 57 select the output signals of the AND gates 62 and 63, respectively. As a result, the loopback setting signals and the loopback test signals, which are sent, are returned as inserted into the positions of #01 and #49 in bit number.

As the first preferred embodiment is so arranged as to cause the loopback test mode to be set from the first terminal station 10, the loopback test circuits 13 and 23 differ from each other in configuration. For this reason, if the loopback test mode is to be set from the second or third terminal station 20 or 30, the same test circuit as the loopback test circuit 13 should be provided in the second or third terminal station 20 or 30, whichever may apply. By contrast in the second embodiment, since test circuits of the same configuration can be used, the loopback test mode can be set from any terminal station by merely shifting the switches 66 and 67 as required.

In the two preferred embodiments of the invention described above, the bit numbers into which test signal bits are to be inserted are two, #01 and #49, because digital multiplex communication takes place between three terminal stations. However, where digital multiplex communication is to take place between a greater number of terminal stations or the connection of additional terminal stations is conceivable to expand the system, the number of bit numbers into which test signal bits are to be inserted can be set at one less than the number of terminal stations.

Furthermore, although the loopback setting signal and loopback test signal bits are sent at a rate of one bit per frame in these preferred embodiments, if the rate is increased to plural bits not more than 48 per frame, the time required for testing can be reduced.

As hitherto described, according to the present invention, in a system of digital multiplex communication between at least three terminal stations, the loopback test mode can be set without fail and loopback tests carried out accordingly, even if a branching unit is provided midway on the transmission line, by performing communication with the insertion of loopback setting signals and loopback test signals for the other party to the communication into predetermined bit positions in the group of bits allocated in each communication frame for each pair of communicating parties.

What is claimed is:

1. A digital multiplex communication system comprising first, second and third terminal stations, transmission lines connecting said first, second and third terminal stations, and a branching unit provided midway on each of said transmission lines, said first and second terminal stations each including a multiplex communications apparatus, said branching unit being arranged between the multiplex communications apparatus of said first terminal station and that of said second terminal station, said first, second and third terminal stations further including first, second and third loopback test circuits, respectively, wherein each of said first, second and third loopback test circuits comprises:

a first timing signal generating circuit for generating a first timing signal pertaining to time positions of specific bits in the frames of transmit signals;

a NOR gate for generating an output signal which is a logical value "1" only when said first timing signal is not generated;

first and second AND gates each having first and second input terminals and receiving at the first input terminal of each of said first and second AND gates said transmit signals and at the second input terminal of said first AND gate said first timing signal and at the second input terminal of said second AND gate the output signal of said NOR gate;

a test signal generating circuit for generating said loopback setting signals and loopback test signals;

a selector supplied with an output signal of said first AND gate and said loopback setting signals and loopback test signals;

an OR gate supplied with output signals of said second AND gate and of said selector;

a second timing signal generating circuit for generating a second timing signal in the time positions of bits corresponding to said specific bits in the frames of receive signals;

a third AND gate having first and second input terminals and receiving at said first input terminal receive signals and at the second input terminal said second timing signal;

a test signal detecting circuit connected to an output of said third AND gate for detecting said loopback setting signals and loopback test signals; and a switch arranged between a detection output terminal of said test signal detecting circuit and said selector.

2. A digital multiplex communication system, as claimed in claim 1, wherein said loopback setting signals are 16-bit signals.

3. A digital multiplex communication system, as claimed in claim 1, wherein said loopback test signals are PN codes of M sequences.

4. A digital multiplex communication system, as claimed in claim 1, wherein said loopback setting signals are transmitted at a rate of one bit per frame.

5. A digital multiplex communication system, as claimed in claim 1, wherein said loopback setting signals are transmitted at a rate of plural bits per frame.

6. A digital multiplex communication system comprising:

first, second and third terminal stations, each of said first, second and third terminal stations having a digital multiplex communications apparatus for communicating with other terminal stations, groups of bits in a communication frame being allocated in advance for communication between said first terminal station and the second and third terminal stations, for communication between said second terminal station and the first and third terminal stations, and for communication between said third terminal station and the first and second terminal stations;

transmission lines connecting said first, second and third terminal stations;

branching circuit means provided midway on each of said transmission lines for distributing groups of bits to and from each of said first, second and third terminal stations according to allocations of said groups of bits, said branching circuit means being arranged between said digital multiplex communication apparatus of said first terminal station and that of said second terminal station;

said first, second and third terminal stations respectively having first, second and third loopback test circuits for loopback-testing the states of said transmission lines including said branching unit; and said first loopback circuit provided in said first terminal station including:

test signal generating means for generating loopback setting signals for setting one of said second and third terminal stations to communicate in a loopback test mode and test signals for use in the loopback test, and means for inserting said loopback setting signals and loopback test signals into specific bit positions in said allocated groups of bits.

7. A digital multiplex communication system, as claimed in claim 6, wherein a second loopback test circuit provided in said second terminal station comprises:

means for taking out specific bit signals in received signal bits corresponding to said specific bit positions;

means for detecting whether or not said specific bit signals are said loopback setting signals; and     means for returning said specific bit signals to said first terminal station upon detection of said loopback setting signals.

8. A digital multiplex communication system, as claimed in claim 7, wherein said specific bit signals which are returned are inserted into bit positions corresponding to said specific bit positions in transmit signals from said second terminal station.

9. The digital multiplex communication system recited in claim 6, wherein said first loopback test circuit provided in said first terminal station further includes means for receiving and detecting loopback setting and loopback test signals from said one of said second and third terminal stations to determine whether the transmission lines have a predetermined characteristic.

10. A method of loopback testing in a digital multiplex communication system having first, second and third terminal stations, transmission lines connecting said first, second and third terminal stations, and a branching circuit provided midway on each of said transmission lines, wherein each of said first, second and third terminal stations has a digital multiplex communication apparatus for communicating with the other terminal stations, said branching circuit being arranged between said digital multiplex communication apparatus of said first terminal station and that of said second terminal station, said method comprising the steps of:

allocating, in a first communication frame, a first group of bits for said first terminal station for communication between said first terminal station and the second terminal station and allocating a second group of bits in said first communication frame for communication between said first terminal station and the third terminal station;

allocating, in a second communication frame, a first group of bits for said second terminal station for communication between said second terminal station and the first terminal station and allocating, in said second communication frame, a second group of bits for communication between said second terminal station and the third terminal station;

allocating, in a third communication frame, a first group of bits for said third terminal station for communication between said third terminal station and the first terminal station and allocating, in said third communication frame, a second group of bits for communication between said third terminal station and the second terminal station;

said branching circuit distributing groups of bits to and from each of said first, second and third terminal stations according to allocations of said groups of bits;

generating at said first terminal station loopback setting signals for setting at least one of said second and third terminal stations in a loopback testing mode in order to carry out a loopback test of the transmission lines to and from the second and third terminal stations including the branching circuit;

generating loopback test signals at said first terminal station; and     sending by said first terminal station said loopback setting signals and said loopback test signals to said at least one of said second and third terminal stations by inserting said loopback setting signals and said loopback test signals into specific bit positions in said allocated groups of bits.

11. The method of loopback testing in a digital multiplex communication system recited in claim 10, further comprising the step of receiving and detecting at said first terminal station loopback setting and loopback test signals from said at least one of said second and third terminal stations and determining whether the transmission lines have a predetermined characteristic.

* * * * *